United States Patent
Sukup et al.

(10) Patent No.: US 8,967,936 B2
(45) Date of Patent: Mar. 3, 2015

(54) SUMP CLEARING DEVICE

(75) Inventors: Eugene G. Sukup, Hampton, IA (US); Charles E. Sukup, Dougherty, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 724 days.

(21) Appl. No.: 13/031,422

(22) Filed: Feb. 21, 2011

(65) Prior Publication Data

US 2012/0213618 A1  Aug. 23, 2012

(51) Int. Cl.
*B65G 65/46* (2006.01)

(52) U.S. Cl.
CPC ........................ *B65G 65/46* (2013.01)
USPC ............................ 414/311; 198/671

(58) Field of Classification Search
CPC .................... B65G 65/466; A01F 25/2018
USPC ................ 414/310–312, 318–321; 198/671
See application file for complete search history.

(56) References Cited

U.S. PATENT DOCUMENTS

| | | | | |
|---|---|---|---|---|
| 3,536,210 A | * | 10/1970 | Dickinson | 414/310 |
| 4,015,734 A | * | 4/1977 | Laidig | 414/310 |
| RE29,309 E | * | 7/1977 | Patterson | 414/310 |
| 4,103,788 A | * | 8/1978 | Sutton | 414/309 |
| 4,824,312 A | * | 4/1989 | Schiltz | 414/310 |
| 5,099,986 A | * | 3/1992 | Kuzub | 198/666 |
| 5,318,444 A | * | 6/1994 | Kuzub et al. | 414/326 |

OTHER PUBLICATIONS

Sukup Manufacturing Company; "High Capacity Unloading Equipment"; High Capacity Bin Unloading Equipment—Tube & Well—Sweepway—The Fastest, Easiest Way to Unload Grain; Sep. 2009; Sukup Manufacturing Co.; U.S.A.

* cited by examiner

*Primary Examiner* — Jonathan Snelting
(74) *Attorney, Agent, or Firm* — Zarley Law Firm, P.L.C.

(57) ABSTRACT

A sump clearing device having a elongated tube attached to a backboard of a sweep auger. A second tube is attached to and extends through a sidewall of a grain bin. The second tube is aligned with the elongated tube. An elongated member having a clearing device is inserted through the second and elongated tube such that the clearing device is positioned above a center sump of the bin.

10 Claims, 2 Drawing Sheets

SUMP CLEARING DEVICE

BACKGROUND OF THE INVENTION

This invention is directed toward a device for clearing packed grain above the sump in a grain bin.

In a grain bin a center sump is provided for removing grain from a bin. Typically, grain falls through a center sump and is transferred outside the bin by a take away auger. Occasionally, after the grain has been sitting for a period of time, the grain can become clogged and will not flow through the center sump. One conventional way of addressing this problem is to open intermediate sumps to unload grain until the gravity flow stops. While this assists in unloading the grain, the process creates stability issues for the grain bin. Alternatively, individuals may enter the bin to dislodge the grain which creates safety issues that may lead to serious injury or death. Accordingly, a need exists in the art for a device that addresses these problems in the art.

An objective of the present invention is to provide a device that easily clears clogged grain in a center sump.

Another objective of the present invention is to provide a device that clears clogged grain in a center sump safely.

These and other objectives will be apparent to one of ordinary skill in the art based upon the following written description, drawing, and claims.

SUMMARY OF THE INVENTION

A sump clearing device having a elongated tube attached to a backboard of a sweep auger. A second tube is attached to and extends through a sidewall of a grain bin. The second tube is aligned with the elongated tube. A pole or cable having a clearing device is inserted through the second tube and elongated tube such that the clearing device is positioned above a center sump of the bin.

DETAILED DESCRIPTION OF THE PREFERRED EMBODIMENT

Figure 1:
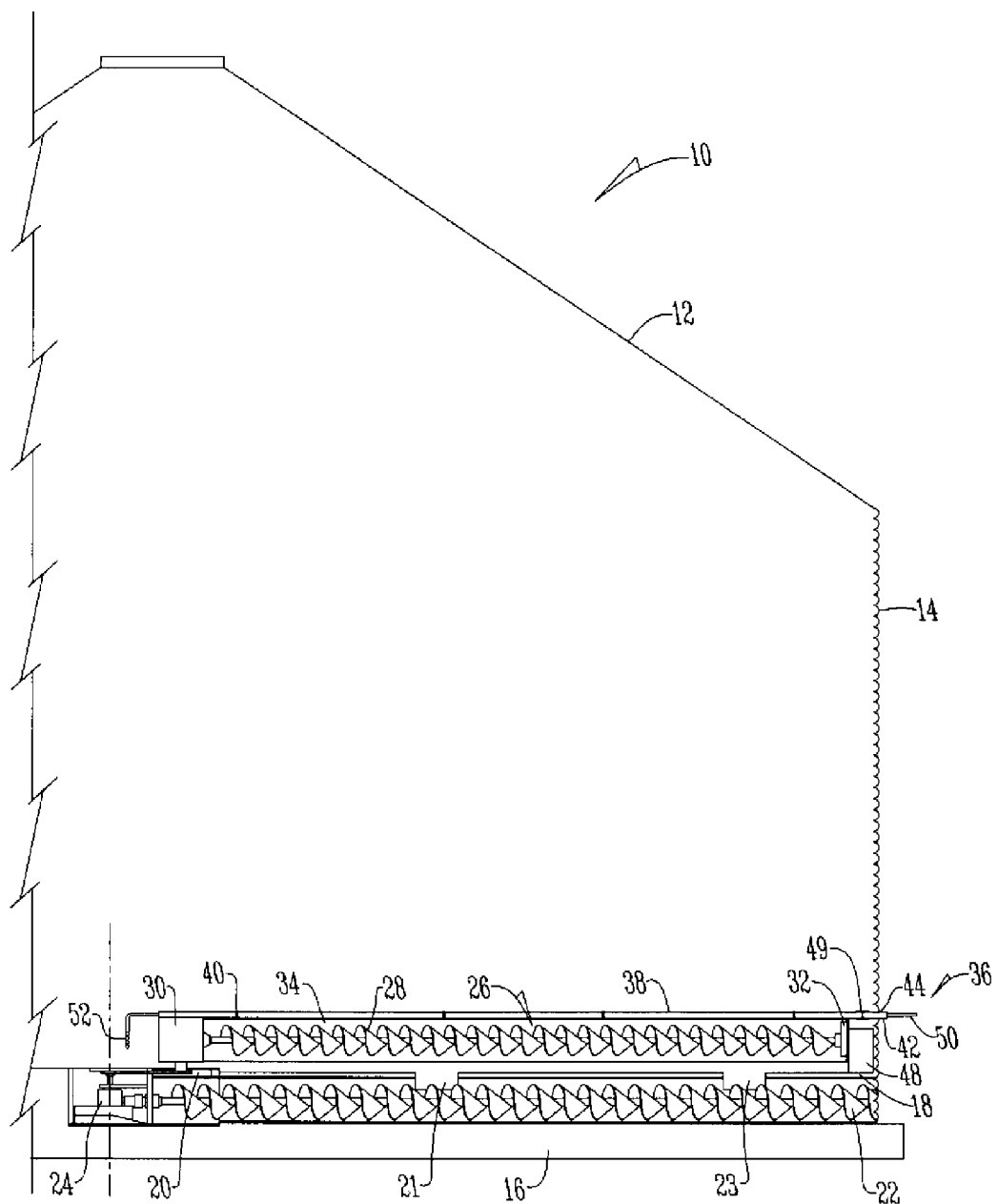
FIG. 1 is a partial side sectional view of a grain bin with a sump clearing device.
Figure 2:
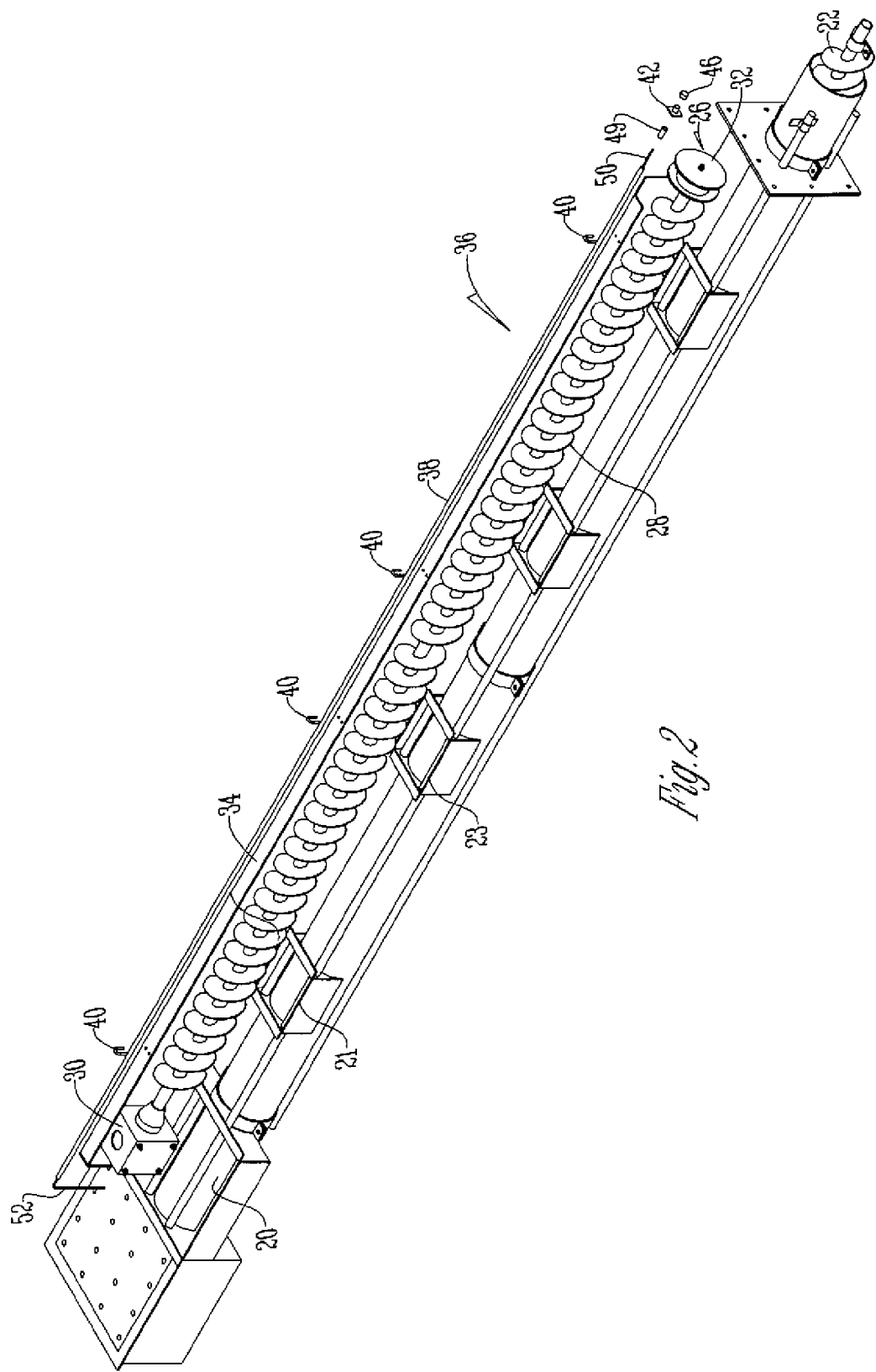
FIG. 2 is an exploded perspective view of a sump clearing device.

Referring to the figures, a grain bin 10 has a roof 12, sidewall 14, and base 16. Within the grain bin 10 is a grain floor 18 that is raised from the base 16. The floor 18 has a center sump 20 that is generally located in the center of the circular floor 18 and intermediate sumps 21 and 23 that are positioned between the center sump 20 and the sidewall 14.

Positioned below the floor 18 and extending from the center sump 20 through the sidewall 14 is a take away or unload auger 22. The unload auger 22 is operatively connected to a gear box 24. Positioned above and supported by the grain floor 18 is a sweep auger 26. The sweep auger 26 has flighting 28 that is rotatably connected to a second gear box 30 at one end and a support 32 such as a wheel at the opposite end. The gear box 30 is operatively connected to gear box 24. Attached to the gear box 30 and support 32 is a backboard 34 that extends along one side of the flighting 28.

The sump clearing device 36 has an elongated hollow tube 38 that is preferably attached to the top of the backboard 34 in any conventional way such as with a U-bolt 40. A second tube 42 is mounted to the sidewall 14 of the bin 10 and extends through a hole 44 in the sidewall 14. Preferably, the outer end of tube 42 is threaded to threadably receive a cap 46 to cover tube 42 when the clearing device 36 is not in use. The hole 44 and second tube 42 are positioned to align and be in communication with tube 38 when the sweep auger 26 engages stop 48 which must be retracted when tube is lined up. Moveably attached about tube 38 is a coupling 49 that is positioned to cover the ends of tubes 38 and 42 when in alignment. The coupling 49 is of a pliable material such as rubber such that when the sweep auger is moved forward the coupling pulls off of tube 42. An elongated member 50 preferably having a clearing device 52 attached to one end is formed to be inserted within tubes 42 and 38 and is of a length greater than the length of tubes 42 and 38. The clearing device 52 is of any size, shape, and structure and preferably has a chain, cable, or rod attached to the end with swivel sufficient to clear center sump without hitting gear box 30. The elongated member 50 is rigid such as a rod or flexible such as a cable.

In operation, when the bin 10 is empty, the sweep auger 26 is moved to engage the stop 48 which is then retracted so that tubes 38 and 42 are then aligned. Once aligned, coupling 49 is moved to cover the ends of tubes 38 and 42 and the grain bin is filled. When the center sump 20 is clogged with grain the cap 46 is removed from tube 42 and elongated member 50 is inserted into and through tubes 42 and 38 such that the clearing device 52 extends out of tube 38 and near center sump 20. Alternatively or in addition to using elongated member 50, warm or hot air may be blown into tube 38 to thaw grain with a blower. Another alternative is to insert a cable into tubes 42 and 38 of a proper length. Once positioned, elongated member 50 is rotated, preferably by an electric drill (not shown) or the like, causing the cable or clearing device 52 to rotate dislodging the grain so that it will flow through the center sump 20.

Accordingly, a sump clearing device has been disclosed that at the very least meets all the stated objectives.

What is claimed is:

1. A sump clearing device for a grain bin, comprising:
   an elongated tube attached to a backboard of a sweep auger;
   a second tube attached to and extending through a sidewall of a grain bin and positioned to align with the elongated tube when the sweep auger engages a stop; and
   an elongated member inserted into the second tube and the elongated tube.

2. The device of claim 1 further comprising a coupling moveably mounted to the elongated tube.

3. The device of claim 2 wherein the coupling is made of rubber.

4. The device of claim 1 wherein a clearing device is attached to one end of the elongated member.

5. The device of claim 4 wherein the clearing device is a rod.

6. The device of claim 4 wherein the clearing device is a chain.

7. The device of claim 4 wherein the clearing device is a cable.

8. The device of claim 1 wherein the elongated member is a rod.

9. The device of claim 1 wherein the elongated member is a cable.

10. The device of claim 1 wherein the elongated member is rotated to clear grain.

* * * * *